United States Patent
Saxton et al.

(10) Patent No.: US 12,338,513 B2
(45) Date of Patent: Jun. 24, 2025

(54) BEARING FORMED OF AN ALUMINUM ALLOY MATERIAL AND METHOD OF MANUFACTURING

(71) Applicant: Tenneco Inc., Lake Forest, IL (US)

(72) Inventors: David Michael Saxton, Ann Arbor, MI (US); Andrew R. Zeagler, Ferndale, MI (US); Terri Ann Giroux, Howell, MI (US); Michael Wagner, Wiesbaden (DE); Katherine Theresa Vaida, Ann Arbor, MI (US)

(73) Assignee: Federal-Mogul Powertrain LLC, Northville, MI (US)

( * ) Notice: Subject to any disclaimer, the term of this patent is extended or adjusted under 35 U.S.C. 154(b) by 203 days.

(21) Appl. No.: 17/358,858

(22) Filed: Jun. 25, 2021

(65) Prior Publication Data
US 2022/0411899 A1    Dec. 29, 2022

(51) Int. Cl.
*C22C 21/10* (2006.01)
*B22D 11/00* (2006.01)
*F16C 33/12* (2006.01)

(52) U.S. Cl.
CPC ............ *C22C 21/10* (2013.01); *B22D 11/003* (2013.01); *F16C 33/121* (2013.01); *F16C 2204/20* (2013.01)

(58) Field of Classification Search
None
See application file for complete search history.

(56) References Cited

U.S. PATENT DOCUMENTS

| 4,452,866 A | * | 6/1984 | Kamiya | C22C 21/003 428/653 |
| 5,453,244 A | * | 9/1995 | Tanaka | C22C 21/02 420/532 |

(Continued)

FOREIGN PATENT DOCUMENTS

| CN | 86103116 | 12/1987 |
| CN | 106995895 A | 8/2017 |

OTHER PUBLICATIONS

Degtyareva, Valentina et al. "Simple Metal and Binary Alloy Phases Based on the fcc Structure: Electronic Origin of Distortions, Superlattices and Vacancies", Crystals, p. 1-13. (Year: 2017).*

(Continued)

*Primary Examiner* — George Wyszomierski
*Assistant Examiner* — Janell C Morillo
(74) *Attorney, Agent, or Firm* — Dickinson Wright PLLC

(57) ABSTRACT

A sliding element, such as a bearing, and a method of manufacturing the sliding element, is provided. The sliding element is formed of an aluminum alloy material which includes zinc in an amount of 5 wt. % to 83 wt. %. The sliding element may also include silicon and/or magnesium. The sliding element is typically formed by casting, heat treating at a temperature of 400° C. to 577° C., and cooling at a rate of less than 50° C. per hour to a temperature ranging from 400° C. to 200° C. The aluminum alloy material is then heat treated at a temperature of 100° to 275° C. for at least 5 hours to form a soft phase consisting essentially of the zinc. The second heat treatment, or possibly both heat treatments, may not be required when the aluminum alloy material includes the magnesium.

8 Claims, 2 Drawing Sheets

(56) References Cited

U.S. PATENT DOCUMENTS

| | | | |
|---|---|---|---|
| 5,954,897 A * | 9/1999 | Ohtake | B60G 7/001 |
| | | | 148/439 |
| 7,572,521 B2 | 8/2009 | Mergen et al. | |
| 2006/0013719 A1 | 1/2006 | Ichikawa et al. | |
| 2009/0269611 A1 | 10/2009 | Liu et al. | |
| 2010/0310896 A1 | 12/2010 | Saruwatari et al. | |
| 2014/0334970 A1 | 11/2014 | Kang | |
| 2016/0273086 A1 | 9/2016 | Renshaw et al. | |
| 2016/0362768 A1 | 12/2016 | Kang | |
| 2018/0223409 A1* | 8/2018 | Allely | C23C 2/40 |
| 2020/0109744 A1 | 4/2020 | Cosentino et al. | |

OTHER PUBLICATIONS

International Search Report, mailed Oct. 27, 2022 (PCT/US2022/073151).

* cited by examiner

BEARING FORMED OF AN ALUMINUM ALLOY MATERIAL AND METHOD OF MANUFACTURING

BACKGROUND

1. Field of the Invention

This invention relates generally to a sliding element, such as a bearing, bushing, or washer formed of an aluminum alloy material, and a method of manufacturing the same.

2. Related Art

Internal combustion engines typically include sliding elements, such as bearings, bushings, or washers, to support rotating shafts and allow them to rotate more smoothly and with less friction. Existing bearings formed of aluminum alloy materials typically contain tin to provide a soft phase that improves sliding properties, conformability, and embeddability. However, tin is expensive and can lead to numerous challenges related to quality and processing. The amount of tin in an aluminum alloy material for a bearing is typically limited to less than 10 weight percent (wt. %) in roll cast and hot bonded aluminum alloy materials.

Zinc is another element that can provide a soft phase in an aluminum alloy material. However, the use of zinc in current aluminum alloy materials is limited. The amount of zinc present in aluminum alloy materials for bearings is typically limited to about 5 weight percent, as the zinc causes hardening and strengthening of the alloy that is unsuitable for a bearing application. In addition, zinc is more soluble in aluminum at engine operating temperatures compared to tin, which limits is ability to improve embeddability.

Silicon is also oftentimes added to aluminum alloy materials for bearings, such as materials containing tin or zinc, to form a hard phase which provides wear resistance and prevents seizure. However, the aluminum alloy material must be heat treated to confer the appropriate size and distribution of the hard silicon phase.

SUMMARY

One aspect of the invention provides a sliding element, such as a bearing for an internal combustion engine, which overcomes many of the challenges described above. The sliding element includes an aluminum alloy material. The aluminum alloy material includes aluminum in an amount of 17 weight percent (wt. %) to 95 wt. % and zinc in an amount of 5 wt. % to 83 wt. %, based on the total weight of the aluminum alloy material. The aluminum alloy material includes a soft phase consisting essentially of zinc, and the soft phase has a Vickers hardness of not greater than 60 $HV_{0.01\ kg}$.

Another aspect of the invention provides a method of manufacturing a sliding element. The sliding element includes casting an aluminum alloy material. The aluminum alloy material includes zinc in an amount of at least 5 wt. %, based on the total weight of the material. Typically, the zinc is in an amount of greater than 5 wt. % or at least 10 wt. %, based on the total weight of the aluminum alloy material. The method further includes heat treating the cast aluminum alloy material at a temperature of 100° C. to 275° C. for at least 5 hours to form a soft phase consisting essentially of the zinc.

Yet another aspect of the invention provides a method of manufacturing a sliding element formed of an aluminum alloy material which includes magnesium in an amount of 0.5 wt. % to 12 wt. %, based on the total weight of the aluminum alloy material. The aluminum alloy material also includes zinc in an amount of at least 5 wt. %, based on the total weight of the material.

BRIEF DESCRIPTION OF THE DRAWINGS

These and other features and advantages of the present invention will become more readily appreciated when considered in connection with the following detailed description and appended drawing.

DETAILED DESCRIPTION OF EXAMPLE EMBODIMENTS

Figure 1:
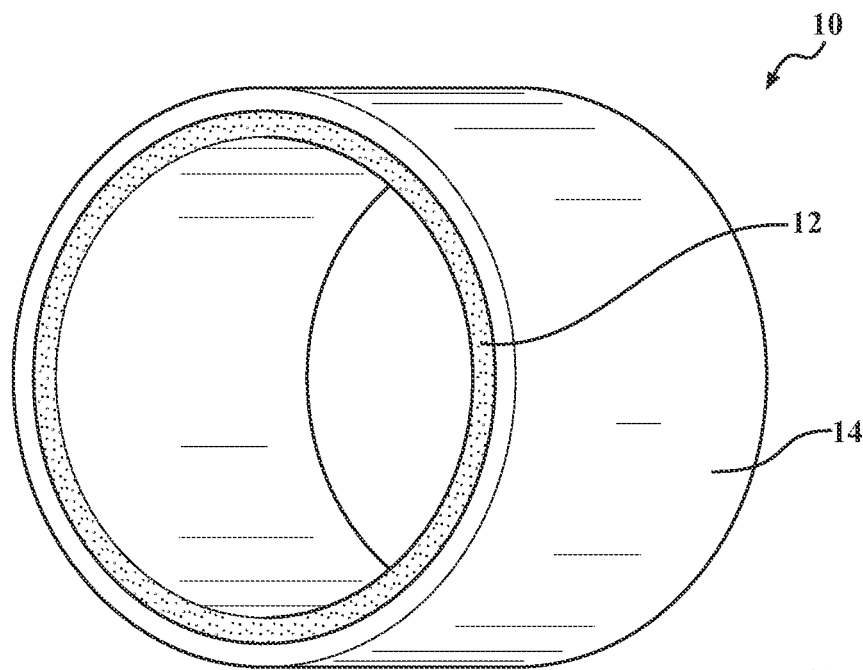
FIG. 1 is a side perspective view of an engine bearing containing a cast aluminum alloy material on a steel backing according to an example embodiment.
Figure 2:
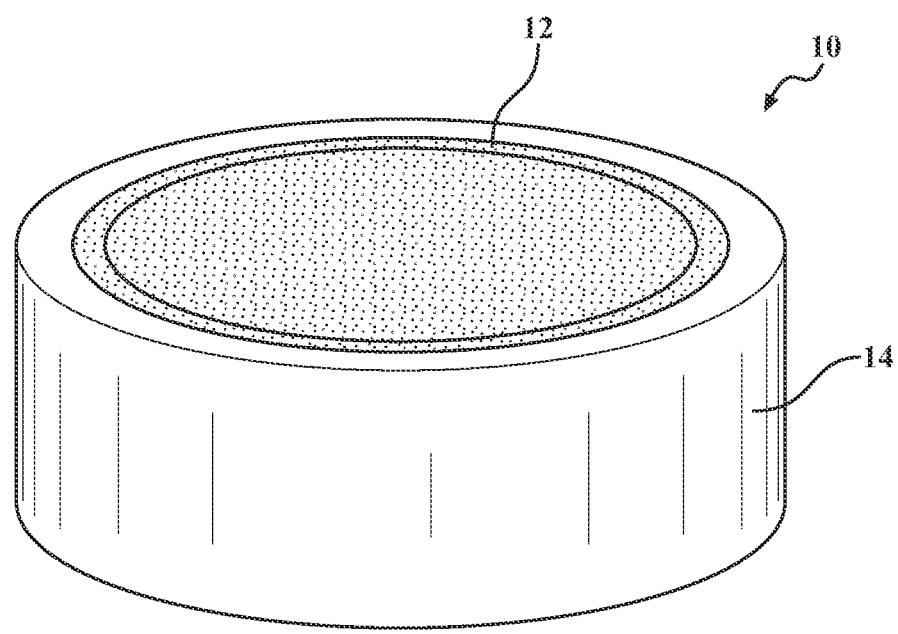
FIG. 2 is a bottom perspective view of the engine bearing of FIG. 1.
Figure 3:
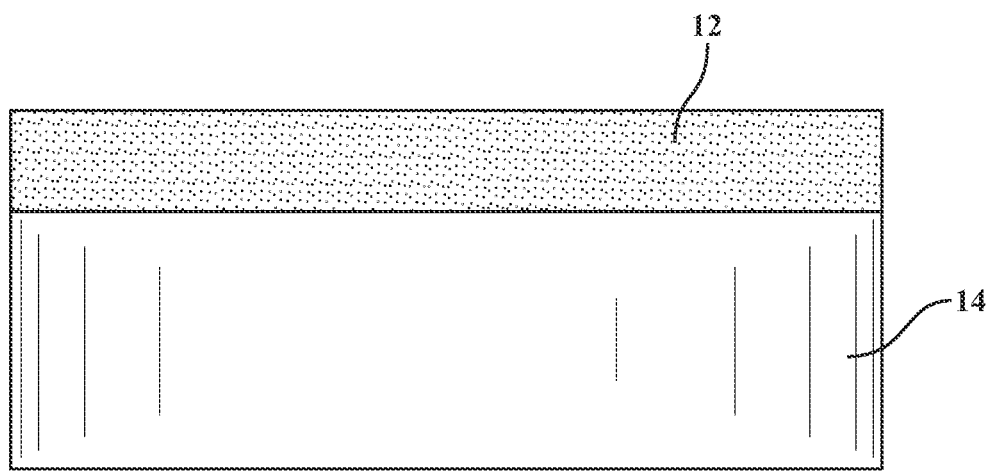
FIG. 3 is a side cross-sectional view of the engine bearing of FIG. 1.
Figure 4:
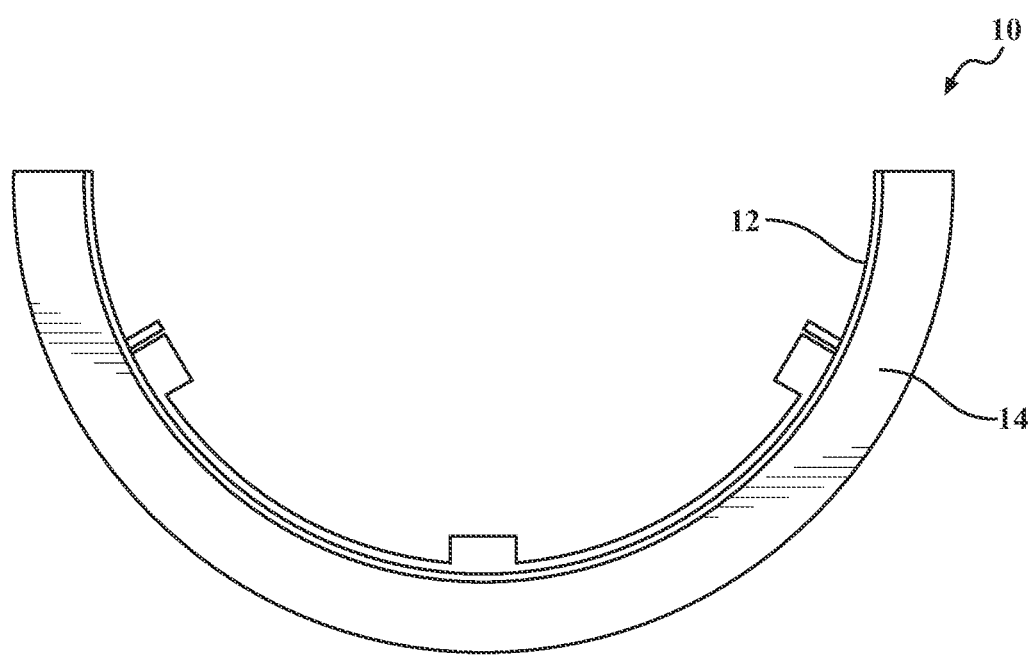
FIG. 4 is a side view of a typical thrust washer which could include the cast aluminum alloy material.

One aspect of the invention provides a sliding element 10, such as a bearing, bushing, or washer for an internal combustion engine. An example of the sliding element 10 in the form of the bearing is shown in FIGS. 1-3. An example of the sliding element 10 in the form of the washer, specifically a typical thrust washer, is shown in FIG. 4. It is to be understood that the description primarily refers to the bearing, but the description is equally applicable to the bushing, washer, or another type of sliding element.

The sliding element 10 includes at least one layer formed of an improved aluminum alloy material 12. The aluminum alloy material 12 is typically bonded to a backing 14 formed of steel. The sliding element 10 can include various other layers and/or materials, in addition to the layer of the aluminum alloy material 12 and the backing 14. For example, the aluminum alloy material 12 can be disposed directly on the backing 14, or other layers could be located between the aluminum alloy material 12 and the backing 14. The sliding element 10 can also have various different designs and/or dimensions depending on the particular application for which it is designed. In the example embodiment of FIG. 1, the sliding element 10 is a bearing and includes a first half shell 16 and a second half shell 18. The half shells 16, 18 extend circumferentially around a center axis A and are joined to one another at opposite ends. The aluminum alloy material 12 typically has a thickness ranging from 100 to 1000 microns, and the steel backing 14 typically has a thickness ranging from 1000 to 5000 microns.

The aluminum alloy material 12 has a composition and microstructure which can provide a combination of wear and seizure advantages, controlled hardening, conformability, and embeddability.

The aluminum alloy material 12 includes aluminum in an amount of 17 weight percent (wt. %) to 95 wt. % and zinc in an amount of 5 wt. % to 83 wt. %, based on the total weight of the aluminum alloy material 12. More preferably, the aluminum alloy material 12 includes the aluminum in an amount of 52.5 wt. % to 88.5 wt. %, based on the total weight of the aluminum alloy material 12, and the zinc in an amount of 10 wt. % to 40 wt. %, based on the total weight of the aluminum alloy material 12. Even more preferably, the aluminum alloy material 12 includes the aluminum in an amount of 58.5 wt. % to 78.5 wt. %, based on the total weight of the aluminum alloy material 12, and the zinc in an amount of 20 wt. % to 40 wt. %, based on the total weight of the aluminum alloy material 12.

Typically, the aluminum alloy material 12 does not include lead. Lead additions in the aluminum alloy material 12 could provide performance benefits, but could also present health and environmental concerns. If present, the lead is typically in an amount of not greater than 0.1 wt. %.

According to certain embodiments, the aluminum alloy material 12 further includes silicon. The silicon in preferably present in an amount of 0.5 wt. % to 12 wt. %, and more preferably 1 wt. % to 6 wt. %, based on the total weight of the aluminum alloy material 12. The aluminum alloy material 12 can also include magnesium. The magnesium is preferably present in an amount of 0.5 wt. % to 12 wt. %, more preferably 1 wt. % to 6 wt. %, based on the total weight of the aluminum alloy material 12. According to one example embodiment, the aluminum alloy material 12 includes the silicon in an amount of 0.5 wt. % to 12 wt. % and the magnesium in an amount of 0.5 wt. % to 12 wt. %, based on the total weight of the aluminum alloy material 12. When the aluminum alloy material 12 includes the magnesium and/or silicon, then after a heat treatment process, the aluminum alloy material 12 includes a hard phase consisting essentially of magnesium and/or silicon.

Additional elements can be added to the aluminum alloy material 12. For example, bismuth and/or tin each in an amount of less than 5 wt. %, based on the total weigh of the aluminum alloy material 12, can be added to improve sliding properties.

The aluminum alloy material 12 of the sliding element 10 typically has an ultimate tensile strength of 150-300 MPa, a yield strength of 100-300 MPa, and Vickers hardness of 50-150 $HV_{0.01\ kg}$. ASTM E-8 or E-8M (metric) are test methods that can be used to measure the ultimate tensile strength and the yield strength. ASTM E384 is a test method that can be used to measure the Vickers hardness.

Another aspect of the invention provides a method of manufacturing the sliding element 10. The method comprises casting the aluminum alloy material 12 and heat treating the cast aluminum alloy material 12 at a temperature of 100° to 275° C. for at least 5 hours to form a soft phase consisting essentially of the zinc. The soft phase has a Vickers hardness of not greater than 60 $HV_{0.01\ kg}$. Small amounts of other elements may be present in the soft phase, but they are in a total amount of less than 1 wt. %. According to one embodiment, the casting step is a continuous process and includes twin roll casting, belt casting, and/or extraction casting. The zinc of the aluminum alloy material 12 forms the soft phase during the step of heat treating the aluminum alloy material 12 at the temperature of 100° C. to 275° C. for at least 5 hours.

According to one embodiment, before the step of heat treating the aluminum alloy material 12 at the temperature of 100° C. to 275° C. for at least 5 hours, the method can include rolling the cast aluminum alloy material 12 and bonding the rolled aluminum alloy material 12 to the steel backing 14.

According to a preferred embodiment, before the step of heat treating the aluminum alloy material 12 at the temperature of 100° C. to 275° C. for at least 5 hours, the method includes heat treating the cast aluminum alloy material 12 at a temperature of 400° C. to 577° C. and cooling the cast aluminum alloy material 12 at cooling rate of less than 50° C. per hour to a temperature ranging from 400° C. to 200° C.

In the embodiment wherein the aluminum alloy material 12 includes the silicon and/or magnesium, the silicon and/or magnesium typically forms a hard phase during the step of heat treating the cast aluminum alloy material 12 at the temperature of 400° C. to 577° C. For example, the hard phase can form when the aluminum alloy material 12 includes the silicon in an amount of 0.5 wt. % to 12 wt. % and/or the magnesium in an amount of 0.5 wt. % to 12 wt. %, based on the total weight of the aluminum alloy material 12.

The aluminum alloy material 12 processed according to the methods described above can provide several advantages, including the wear and seizure advantages of silicon, control and hardening conferred by zinc additions, and the soft phase to improve conformability and embeddability. In addition, the zinc is less expensive than tin or aluminum, and the difference in liquidus and solidus temperatures for aluminum-zinc is much smaller than that of aluminum-tin. This results in a more homogenous cast structure, which eliminates many of the processing problems associated with tin. Zinc can be used in combination with silicon as a hard particle, with zinc acting as both a solution hardening element and the soft phase.

Several other advantages are achieved when the aluminum alloy material 12 includes the magnesium. First, it enables the formation of large-scale zinc precipitates, which increase embeddability relative to small-scale zinc precipitates. The magnesium may also significantly reduce heat treatment time and costs, or even obviate the need for the lower temperature heat treatment, and expedites the formation of hard phase particles, such as Mg—Si particles and Si particles. For example, the aluminum alloy material 12 including the magnesium could be cast, heated to a temperature of 400° C. to 577° C., and then cooled at a cooling rate of less than 50° C. per hour to a temperature ranging from 400° C. to 200° C., without the second heat treating step.

Obviously, many modifications and variations of the present invention are possible in light of the above teachings and may be practiced otherwise than as specifically described while within the scope of the following claims. In particular, all features of all claims and of all embodiments can be combined with each other, as long as they do not contradict each other.

What is claimed is:

1. A sliding element, comprising:
an aluminum alloy material, the aluminum alloy material including aluminum in an amount of at least 17 weight percent (wt. % ), magnesium in an amount of 0.5 wt. % to 12 wt. %, silicon in an amount of 0.5 wt. % to 6 wt. %, and zinc in an amount of 20 wt. % to 83 wt. %, based on the total weight of the aluminum alloy material,
the aluminum alloy material including a first phase containing zinc precipitates and the first phase having a Vickers hardness of not greater than 60 $HV_{0.01\ kg}$.

2. The sliding element of claim 1, wherein the aluminum alloy material includes the aluminum in an amount of at least 52.5 wt. %, the zinc in an amount up to 40 wt. %, and lead, if present, in an amount of not greater than 0.1 wt. %, based on the total weight of the aluminum alloy material.

3. A sliding element, comprising:
an aluminum alloy material, the aluminum alloy material including an aluminum in an amount of at least 58.5 wt. %, magnesium in an amount of 0.5 wt. % to 12 wt. %, silicon in an amount of 0.5 wt. % to 6 wt. %, zinc in an amount of 20 wt. % to 40 wt. %, and lead, if present, in an amount of not greater than 0.1 wt. %, based on the total weight of the aluminum alloy material, the aluminum alloy material including a first phase containing zinc and the first phase having a Vickers hardness of not greater than 60 $HV_{0.01\ kg}$.

4. The sliding element of claim 1 including the silicon in an amount of 1 wt. % to 6 wt. %, based on the total weight of the aluminum alloy material.

5. The sliding element of claim 1 including the magnesium in an amount of 1 wt. % to 6 wt. %, based on the total weight of the aluminum alloy material.

6. The sliding element of claim 1, wherein the aluminum alloy material includes a second phase containing the magnesium and/or silicon.

7. A sliding element, comprising:

an aluminum alloy material, the aluminum alloy material including aluminum in an amount of at least 17 weight percent (wt. %), magnesium in an amount of 0.5 wt. % to 12 wt. %, silicon in an amount of 0.5 wt. % to 6 wt. %, and zinc in an amount of 10 wt. % to 83 wt. %, based on the total weight of the aluminum alloy material, the aluminum alloy material including a first phase containing zinc precipitates, the first phase having a Vickers hardness of not greater than 60 $HV_{0.01\ kg}$, and wherein the aluminum alloy material has an ultimate tensile strength of 150-300 MPa, a yield strength of 100-300 MPa, and Vickers hardness of 50-150 $HV_{0.01\ kg}$.

8. The sliding element of claim 1, wherein the first phase of the aluminum alloy material consists essentially of zinc.

\* \* \* \* \*